United States Patent
Lechner

(10) Patent No.: US 6,910,892 B2
(45) Date of Patent: Jun. 28, 2005

(54) METHOD AND APPARATUS FOR AUTOMATICALLY COLLECTING TERRAIN SOURCE DATA FOR DISPLAY DURING FLIGHT SIMULATION

(75) Inventor: Robert J. Lechner, St. Charles, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/408,640

(22) Filed: Apr. 7, 2003

(65) Prior Publication Data

US 2003/0190589 A1 Oct. 9, 2003

Related U.S. Application Data

(62) Division of application No. 09/942,179, filed on Aug. 29, 2001.

(51) Int. Cl.[7] ............................................. G09B 19/16
(52) U.S. Cl. ........................ 434/43; 434/37; 434/47; 345/430; 701/301
(58) Field of Search ........................... 434/37, 47, 43, 434/30, 38; 701/120, 300, 301

(56) References Cited

U.S. PATENT DOCUMENTS

| | | |
|---|---|---|
| 4,645,459 A | 2/1987 | Graf et al. |
| 4,985,854 A | 1/1991 | Wittenburg |
| 5,053,778 A | 10/1991 | Imhoff |
| 5,317,689 A | 5/1994 | Nack et al. |
| 5,381,338 A | 1/1995 | Wysocki et al. |
| 5,579,456 A | 11/1996 | Cosman |
| 5,616,031 A | 4/1997 | Logg |
| 5,699,497 A | 12/1997 | Erdahl et al. |
| 5,838,262 A | 11/1998 | Kershner et al. |
| 5,920,321 A | 7/1999 | Owen et al. |
| 5,936,245 A | 8/1999 | Goillot et al. |
| 5,936,552 A | 8/1999 | Wichgers et al. |
| 6,005,581 A * | 12/1999 | Gjullin ....................... 345/582 |
| 6,023,278 A | 2/2000 | Margolin |
| 6,053,736 A | 4/2000 | Huffman et al. |
| 6,134,500 A | 10/2000 | Tang et al. |
| 6,218,965 B1 | 4/2001 | Gendron et al. |
| 6,259,988 B1 | 7/2001 | Galkowski et al. |
| 6,262,679 B1 | 7/2001 | Tran |
| 6,268,858 B1 | 7/2001 | Nathman et al. |
| 6,292,745 B1 | 9/2001 | Robare et al. |
| 6,317,690 B1 * | 11/2001 | Gia ............................ 701/301 |
| 6,370,539 B1 | 4/2002 | Ashby et al. |
| 6,422,508 B1 * | 7/2002 | Barnes ...................... 244/3.16 |
| 6,424,889 B1 | 7/2002 | Bonhoure et al. |
| 6,480,789 B2 * | 11/2002 | Lin ............................ 701/301 |

* cited by examiner

Primary Examiner—Chanda L. Harris
Assistant Examiner—John Sotomayor
(74) Attorney, Agent, or Firm—Alston & Bird LLP

(57) ABSTRACT

A method and apparatus are provided for automatically generating a terrain model for display during a simulated flight along a predefined mission route. The apparatus includes a mission profiler that automatically determines the area containing the mission route for which the terrain source data is required and the respective resolution of different regions within the area. The apparatus also includes an apparatus for automatically collecting the terrain source data including a search engine for automatically searching electronic collections of terrain source data to identify terrain source data covering the area containing the mission route. The apparatus also includes an image engine for processing the terrain source data into one or more predefined formats and a terrain engine for automatically compiling the processed data to create a terrain model for display during flight simulation.

13 Claims, 7 Drawing Sheets

METHOD AND APPARATUS FOR AUTOMATICALLY COLLECTING TERRAIN SOURCE DATA FOR DISPLAY DURING FLIGHT SIMULATION

CROSS-REFERENCE TO RELATED APPLICATIONS

This application is a divisional of U.S. application Ser. No. 09/942.179. filed Aug. 29, 2001. which is hereby incorporated herein in its entirety by reference.

FIELD OF THE INVENTION

The present invention relates generally to methods and apparatus associated with flight simulation and, more particularly, to methods and apparatus for generating a terrain model for display during flight simulation.

BACKGROUND OF THE INVENTION

Pilots frequently wish to simulate a mission prior to actually flying the mission. By simulating the mission, a pilot can become familiar with the mission route and can either avoid or prepare in advance for any portions of the mission that may require special effort or attention. In order to simulate a mission route, a pilot initially defines the mission route, such as by means of a mission planning system (MPS) or the like. As known to those skilled in the art, a mission planning system receives input from a pilot that defines a plurality of points along the mission route. For example, the pilot typically defines the beginning and end point(s) of the mission as well as points along the route at which the aircraft will change direction. The pilot also defines points that identify the location of targets or other features of interest. In addition to merely entering the points, the pilot also indicates the significance of each point, such as by indicating that the point represents an airfield, a target, a point at which the aircraft will change direction or the like. Based upon the plurality of points defined by the pilot, the MPS constructs the mission route to include each of the plurality of points.

Once the pilot has defined the mission route, a terrain model designer determines the area for which terrain source data will be required. In this regard, terrain source data is typically obtained, not just along the mission route, but for some distance on either side of the mission route to permit the flight simulation to continue if the aircraft deviates from the mission route. The size of the area for which terrain source data is required is typically based, in part, upon the aircraft platform including the range of the sensors onboard the aircraft, the turning radius of the aircraft and any other aircraft parameter that affects the size of the area that will be viewed by the pilot or interrogated by the aircraft and its sensors. In this regard, some aircraft platforms are capable of gathering and analyzing more remote sensor data than other aircraft platforms and therefore generally require terrain source data to be collected for larger areas surrounding the mission route in order to properly simulate the planned mission.

Additionally, the terrain model designer must determine the resolution with which the terrain source data should be displayed. Typically, different portions of the terrain source data are displayed at different resolutions, each of which is typically defined by the terrain model designer. In this regard, the images in the vicinity of an airfield, a target or other feature of interest are generally defined with greater resolution than more general terrain that is somewhat removed from the mission route.

As described above, the terrain model designer must therefore determine the area for which terrain source data is required and the respective resolution of each different region within the area for which terrain source data is required in order to permit the proper images to subsequently be generated and presented to the pilot during flight simulation. As will be apparent, the determination of the area for which terrain source data is required and the respective resolution of each region within that area is not only a time-consuming task, but is also prone to errors.

Based upon the definition of the area, a terrain model designer then collects the terrain source data required to construct a terrain model for a simulated flight along the mission route. Among other things, the terrain source data includes digitized photographs of the area over which the mission route will be flown. In addition to imagery, the terrain source data includes elevational data defining the elevation of the terrain along the mission route and feature data defining a variety of features, including obstructions, targets and the like, along the mission route. The terrain model designer can collect at least some of the terrain source data from terrain source data that is stored in a local memory device. However, the terrain model designer oftentimes must collect additional terrain source data for areas along the mission route for which no terrain source data is locally stored. Additionally, even in instances in which the terrain source data is stored in a local memory device, the terrain model designer typically canvasses other sources of terrain source data to determine the availability of terrain source data that is of higher quality and/or more recent than the terrain source data that is stored in a local memory device. If terrain source data that is of higher quality and/or more recent is available, the terrain model designer will generally obtain the higher quality terrain source data for use during the flight simulation in lieu of the terrain source data that is already stored by a local memory device, but that is of a lower quality and/or is less recent.

Electronic collections of terrain source data are maintained by a variety of sources. For example, terrain source data may be available from the joint services imaging processing station (JSIPS), the Gateway Data Navigator (GDN), the United States Imagery and Geospatial Information Services (USIGS), the master environment library (MEL), weather service feeds, commercial databases and the like. For many of these sources, however, the terrain model designer must complete and submit appropriate documents requesting the terrain source data and, in some instances, must provide proof that the terrain model designer as well as the pilots and other personnel who will have access to the terrain source data have appropriate clearances to access and view the terrain source data. As will be apparent, the process of searching, collecting and assimilating the terrain source data can also be a time-consuming process.

Once the terrain source data has been collected, the terrain source data is generally processed in order to improve or refine the resulting image and to extract various features from the terrain source data. In this regard, software programs, such as the Imagine software package by ERDAS, Inc. of Atlanta, Ga., provide many standard image processing functions, such as image enhancement, image registration, image rectification, image mosaic functions and elevation extraction. Additionally, these conventional software programs provide two-dimensional feature extraction and three-dimensional feature extrusion as well as material classification. While these conventional software programs perform the various image processing and feature extraction functions, the terrain model designer must generally provide the proper data in the correct format and must manually initiate and interact with the software program to perform the desired image processing.

Following the image processing operations, the terrain model designer provides the terrain source data to a terrain modeling software. The terrain modeling software compiles the terrain source data to form a terrain model. As with image processing, a variety of software programs, such as the Terra Vista software package from Terrain Experts, Inc. of Tucson, Ariz., are commercially available for generating a terrain model based upon terrain source data. The terrain model can then be provided to a flight simulator and, more particularly, to the image generator of a flight simulator for generating the necessary images during a simulation of the mission by the pilot.

While the terrain model that is necessary to simulate the mission to be flown by the pilot can be constructed in the manner described above, the manual process of collecting and processing the terrain source data and constructing the terrain model is time-consuming and requires that the terrain model designer have substantial experience. For example, the terrain model designer must often locate and obtain terrain source data from a variety of different collections. In addition, the terrain model designer must oftentimes determine the area for which terrain source data is to be collected and the resolution of the terrain source data for different regions within the area in order to properly simulate the mission route with the desired degree of detail. As such, it would be desirable to develop an improved method and apparatus for generating the terrain model for display during a simulated flight along a predefined mission route that could reliably and accurately generate the terrain model in a more efficient manner while requiring less manual intervention.

SUMMARY OF THE INVENTION

A method and apparatus are provided for automatically generating a terrain model for display during a simulated flight along a predefined mission route. By automatically generating the terrain model, the method and apparatus of the present invention are more efficient than conventional techniques for generating terrain models that require extensive manual participation. The method and apparatus of one advantageous embodiment also automatically collect and combine project source data with the terrain source data such that the resulting terrain model is an accurate depiction of the area through which the mission will be flown.

The apparatus for automatically generating the terrain model includes a mission profiler. The mission profiler automatically determines the area containing the mission route for which the terrain source data is required. According to one embodiment, the mission profiler includes an input for receiving data at least partially defining the mission route. Additionally, the mission profiler of this embodiment includes a processing element for automatically determining the area containing the mission route for which terrain source data is required. The processing element also automatically divides the area into a plurality of regions based upon the mission route and determines the respective resolution of the terrain source data for each region.

The processing element is typically capable of determining the area and the respective resolution of regions within the area based upon predefined criteria. In one embodiment, the input of the mission profiler can receive adjustments to at least some of the predefined criteria such that the processing element will, instead, determine the area and the respective resolution of regions within the area based upon the adjusted criteria. The input of the mission profiler can also receive data defining the aircraft platform and/or the simulator platform. As such, the processing element can determine the area and the respective resolution of regions within the area based at least partially upon the aircraft platform and/or the simulator platform. The input of the mission profiler can also receive data defining a plurality of different types of points along the mission route. In this embodiment, the processing element determines the area and the respective resolution of regions within the area based at least in part upon the different types of points along the mission route, such as points designating an airfield, a target or the like.

The apparatus for automatically generating a terrain model can also include an apparatus for automatically collecting terrain source data for display during flight simulation. The apparatus for automatically collecting terrain source data includes a search engine for automatically searching a plurality of electronic collections of terrain source data to identify terrain source data covering the area containing the mission route. The apparatus for automatically collecting terrain source data also includes an input for receiving data defining the area containing the mission route for which terrain source data is required and a memory device for storing the terrain source data covering the area containing the mission route that has been identified by the search engine.

The memory device typically stores terrain source data from prior mission routes. During the process of automatically searching the electronic collections of terrain source data, the search engine preferably compares the terrain source data obtained from the electronic collection(s) with terrain source data from prior mission routes to identify the terrain source data that is most acceptable for the flight simulation for the mission route. For example, the search engine may select the terrain source data that is of the highest quality and/or is the most recent. In one embodiment, the search engine does not initially obtain the terrain source data itself. Instead, the search engine of this embodiment obtains information representative of the terrain source data that is obtainable from the electronic collection(s). This information is generally termed "metadata". The search engine then obtains only that terrain source data from the electronic collection(s) that is more acceptable for the flight simulation of the mission route than the terrain source data from prior mission routes that is already stored by the memory device. Thus, the method and apparatus of this embodiment only collect the additional terrain source data that is required to depict the area containing the mission route, thereby increasing the efficiency with which the terrain source data is collected.

The memory device preferably stores the terrain source data that is obtained from the electronic collection(s). In one embodiment, the memory device can therefore include a first memory device for storing information representative of the terrain source data and a second memory device for storing the terrain source data itself.

The apparatus for automatically generating a terrain model also includes an image engine for processing terrain source data into one or more predefined formats. In this regard, the image engine automatically generates processed terrain data having one of the predefined formats and, typically, at least one of a corrected elevation model, a material map, vector data and a feature model.

The apparatus for automatically generating a terrain model further includes a terrain engine for automatically compiling the processed data to create a terrain model for display during flight simulation. In this embodiment, the terrain engine includes a data importer for receiving the processed data for the area containing the mission route. For example, the processed data can include imagery data, elevational data, feature data and/or mission route data. The data importer also receives project source data defining geospecific properties for the area containing the mission route. For example, the project source data can include information related to vegetation and/or cultural features. The terrain engine also includes a terrain compiler for automatically creating the terrain model for display during flight simulation based upon a combination of both the processed data and the project source data. The resulting terrain model can then be provided to a flight simulator and, more particularly, the image generator of a flight simulator for generating the requisite image during simulation of the mission.

In addition to the apparatus for automatically generating the terrain model, a corresponding method is also provided. Similarly, corresponding methods for automatically determining the flight simulation mission profile, for automatically collecting terrain source data, for automatically processing the terrain source data into one or more predefined formats and for automatically compiling the processed data to create a terrain model are also provided. As a result of the automatic generation of the terrain model, the method and apparatus of the present invention permit the terrain model to be more efficiently generated with substantially less manual participation than conventional techniques. Additionally, the resulting terrain model should be of the highest quality since the terrain source data that is most acceptable, typically by being of the highest quality and/or the most recent, is collected and compiled to create the terrain model. Moreover, the terrain model may also be partially based upon project source data to further improve the realistic appearance of the resulting terrain model.

BRIEF DESCRIPTION OF THE DRAWINGS

Figure 1:
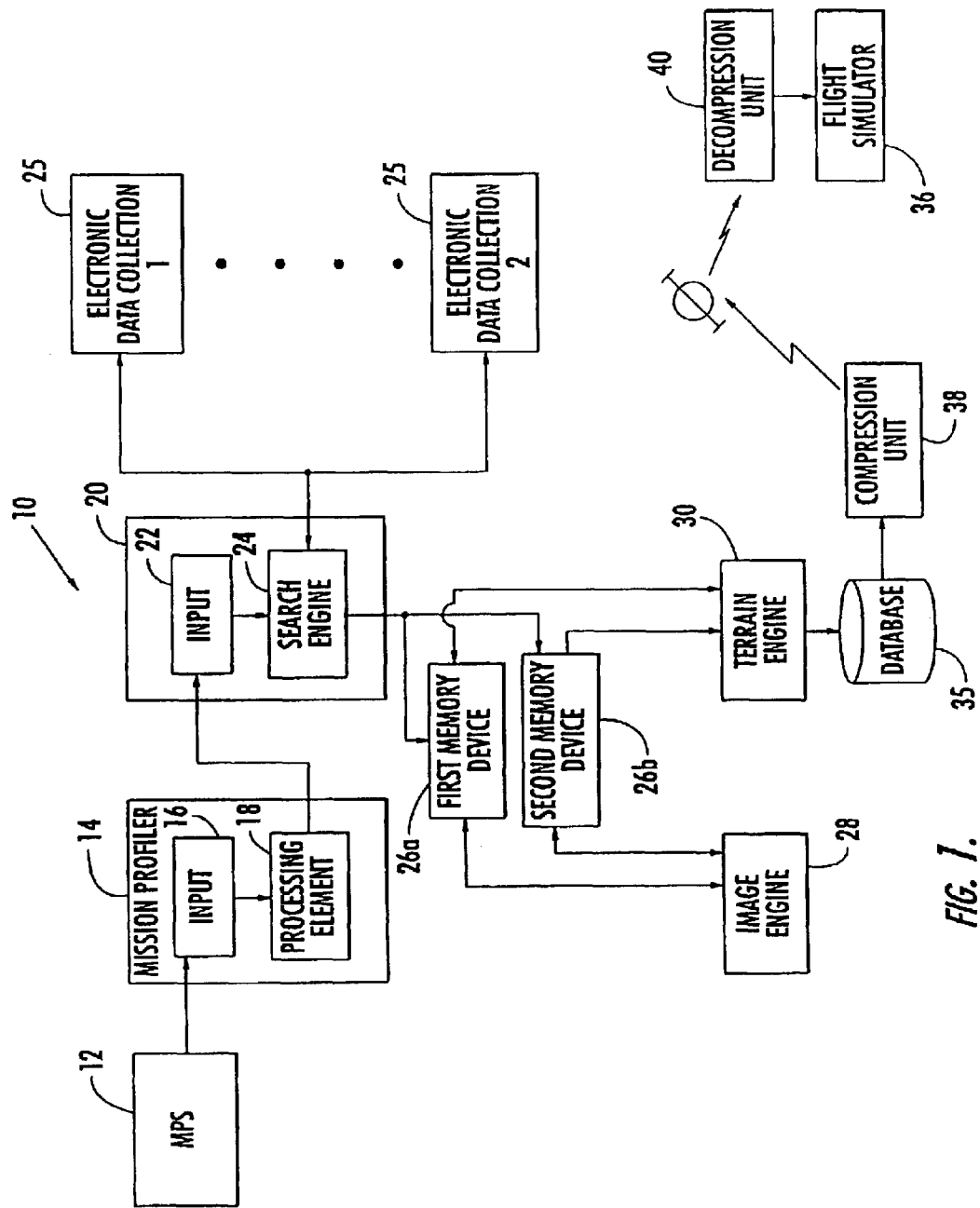
Figure 2:
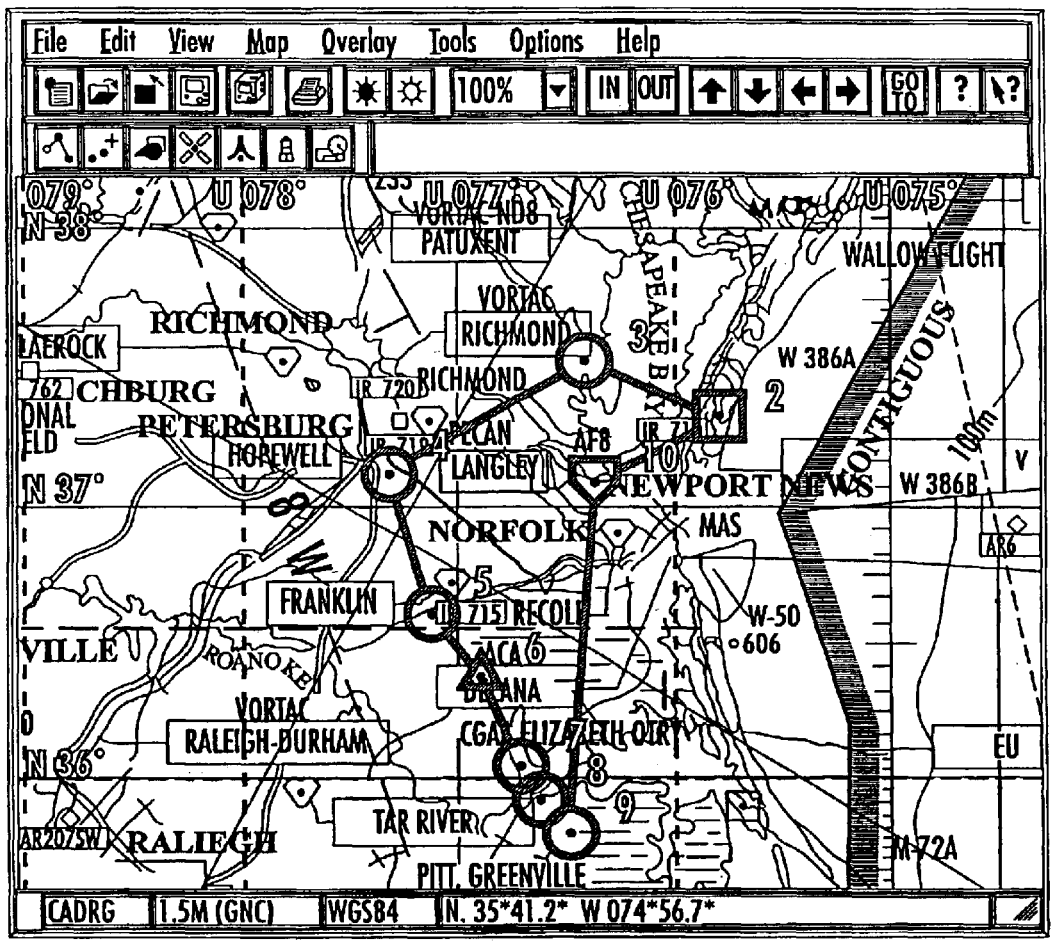
Figure 3:
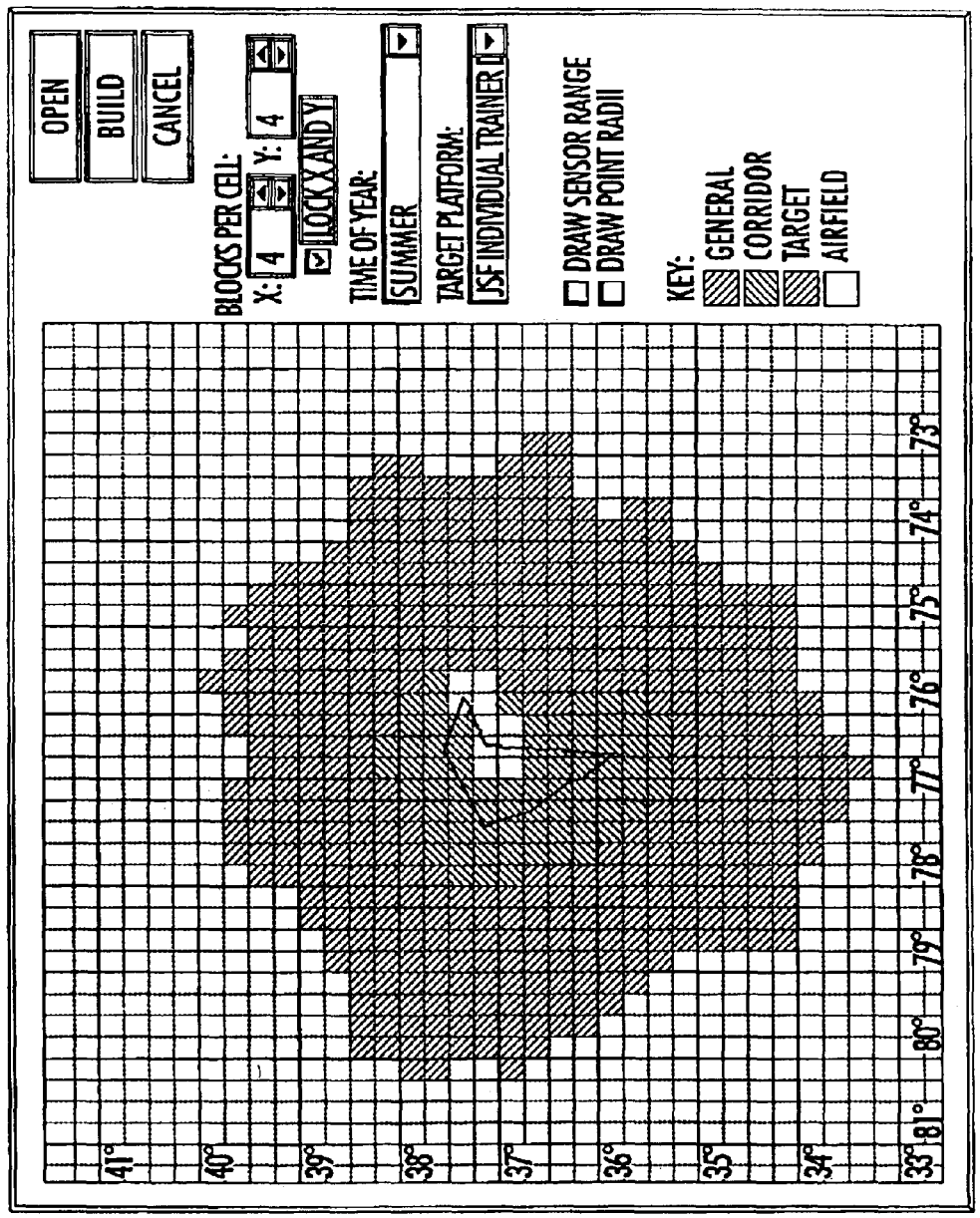
Figure 4:
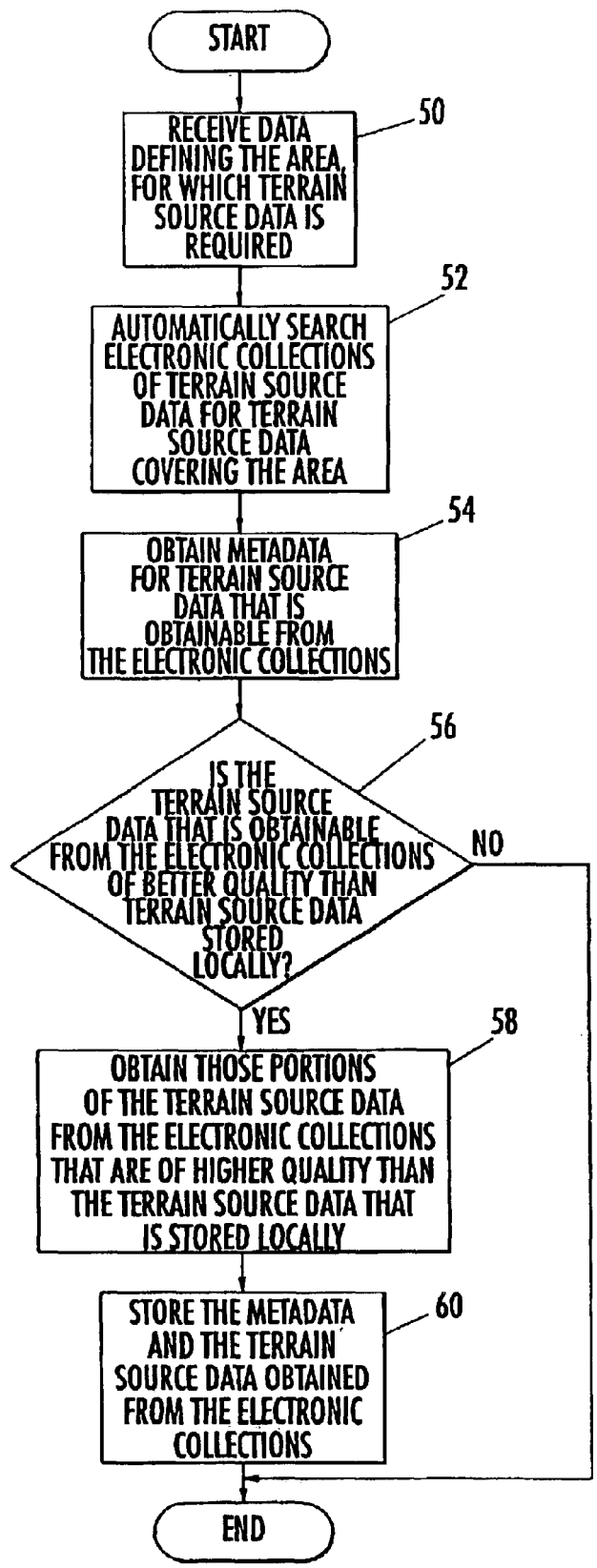
Figure 5:
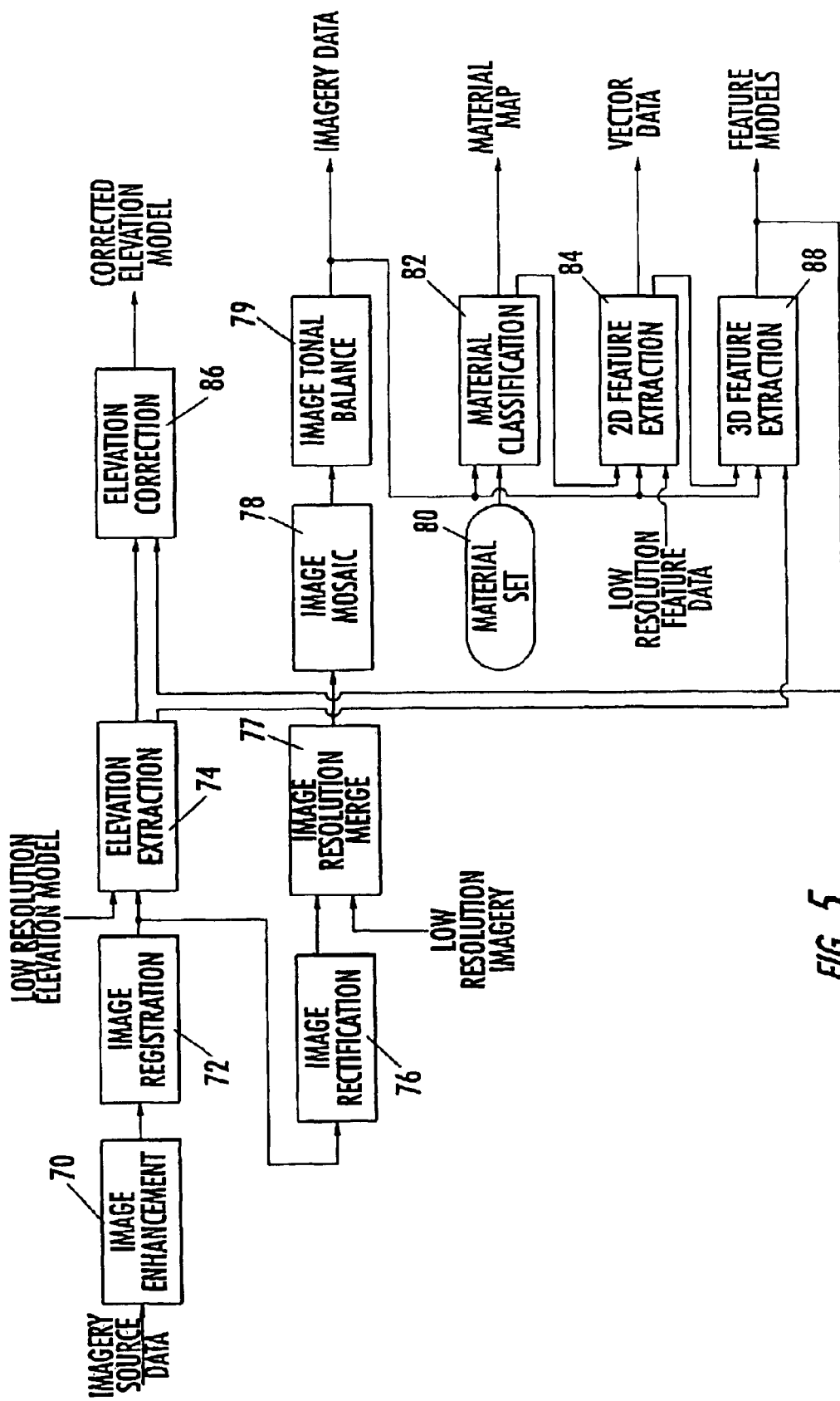
Figure 6:
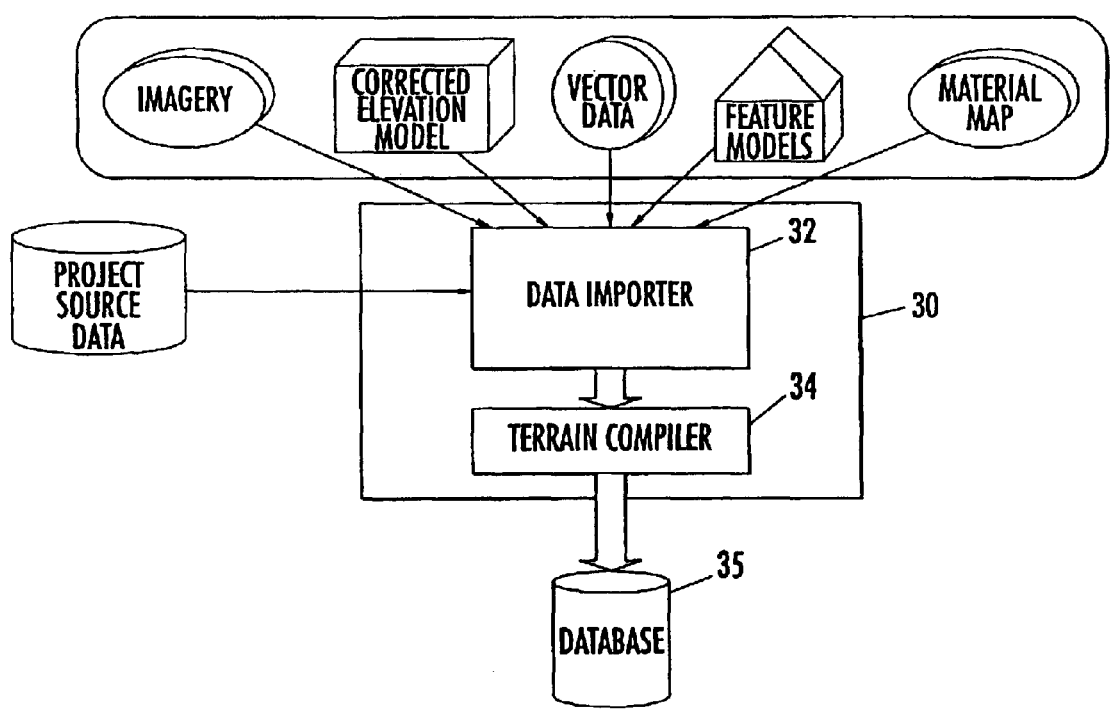
Figure 7:
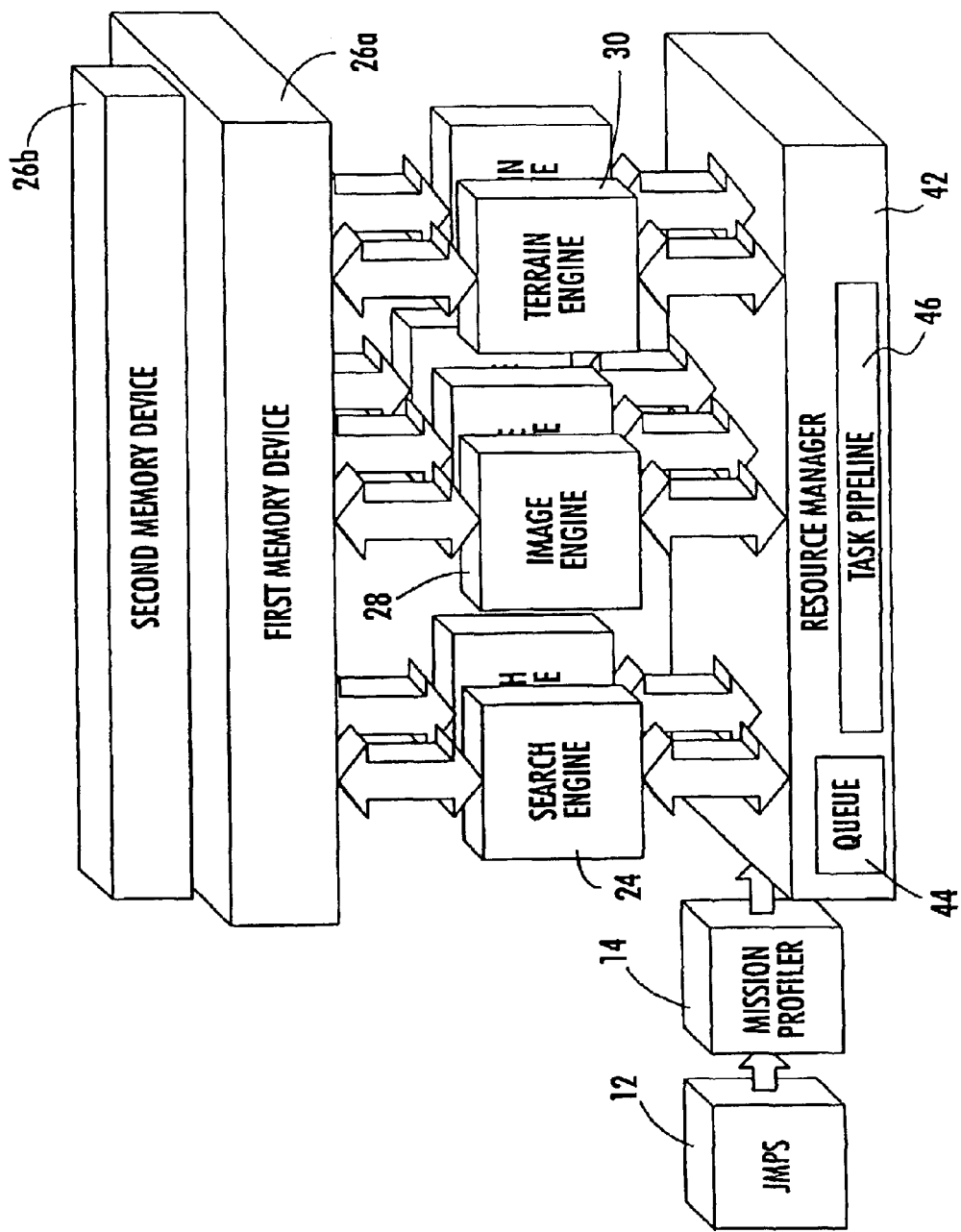

Having thus described the invention in general terms, reference will now be made to the accompanying drawings, which are not necessarily drawn to scale, and wherein:

FIG. 1 is a block diagram of an apparatus for automatically generating a terrain model for display during a simulated flight along a predefined mission route according to one embodiment of the present invention;

FIG. 2 is a graphical representation of a mission route;

FIG. 3 is a graphical representation of the area containing the mission route for which terrain source data is required and the respective resolution of different regions within the area as determined by a mission profiler according to one embodiment of the present invention;

FIG. 4 is a flow chart illustrating the operations performed by a method and apparatus for automatically collecting terrain source data including a search engine according to one embodiment of the present invention;

FIG. 5 is a graphical representation of an image engine according to one embodiment of the present invention for processing the terrain source data into one or more predefined formats that may be accepted by the terrain engine;

FIG. 6 is a block diagram of a terrain engine for automatically compiling terrain source data and project source data to create the terrain model for display during flight simulation according to one embodiment of the present invention; and FIG. 7 is a block diagram illustrating an apparatus for automatically generating the terrain model during a simulated flight along the predefined mission route according to one embodiment of the present invention which includes a plurality of parallel channels.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, an apparatus 10 for automatically generating a terrain model for display during a simulated flight along a predefined mission route is depicted. Although the upcoming flight to be simulated will be consistently referred to as a mission, the upcoming flight need not necessarily be a military exercise, but can be a commercial flight or a flight taken for other reasons, such as pleasure. The mission route can be defined in a variety of different manners. However, the mission route is commonly provided by a mission planning system (MPS) 12.

In order to define a mission route, a pilot initially provides the MPS 12 with a description of the general geographic region within which the mission will be flown. The MPS will then display a two-dimensional representation of a map of the geographic region. The pilot will then plot the mission route upon the map in a manner known to those skilled in the art. For example, the pilot can identify specific points along the mission route by sequentially positioning a cursor at each respective point and then providing an indication, such as by depressing the enter key or the like, that the current position of the cursor identifies a point along the mission route. Based upon the location of the points identified upon the map, the MPS can determine the latitude and longitude of each point to facilitate construction of the mission route. Instead of selecting points upon the map to be indicative of points along the mission route, however, the pilot can directly enter the latitude and longitude of points along the mission route, if known.

Based upon the points identified by the pilot, the MPS 12 constructs the mission route as depicted in FIG. 2. In addition to merely designating points along the route for purposes of the construction of the mission route, the pilot can identify characteristics associated with each of the points. For example, the pilot can indicate if the point represents the location of an airfield, such as the airfield from which the aircraft is taking off and/or landing. Additionally, the pilot can indicate points along the mission route that are targets as well as points along the mission route at which the aircraft will turn or otherwise change course. The MPS records the additional information associated with respective points along the mission route. Additionally, the MPS can display icons associated with each point along the mission route to represent the characteristics associated with the point. For example, the MPS can present points associated with the starting point, targets and turns with different icons, such as the home plate and square icons, the triangular icon and the circular icon, respectively, in FIG. 2.

Once the pilot, in conjunction with the MPS 12, has defined the mission route, the MPS provides the mission route to the apparatus 10 of the present invention such that a terrain model can be automatically generated for subsequent display during a simulated flight along the predefined mission route. In this regard, the MPS typically provides the apparatus with the coordinates that define the various segments of the mission route as well as data defining characteristics associated with the respective points as described above. As shown in FIG. 1, the apparatus of the present invention includes a mission profiler 14 that initially receives the data provided by the MPS that defines the mission route. The mission profiler automatically determines the area that contains the mission route for which terrain source data is required. That is, the mission profiler automatically identifies the area along the mission route as well as areas in the vicinity of the route that may be viewed during flight simulation, either by the pilot or by onboard sensors, and for which terrain source data is required.

The automated mission profiler 14 includes an input 16 for receiving data at least partially defining the mission route. In this regard, the input receives data from the MPS 12 that defines the mission route entered by the pilot, typically in terms of the coordinates of points along the mission route as well as characteristics associated with various ones of the points. The automated mission profiler also includes a processing element 18 for automatically determining the area containing the mission route for which imagery data is required. The processing element automatically determines the area for which terrain source data is required based upon a plurality of parameters. For example, the processing element can determine the area for which terrain source data is required based, at least in part, upon data defining the aircraft platform and/or the simulator platform. In this regard, the data defining the aircraft platform generally includes data defining the ranges of the various sensors onboard the aircraft, data defining the turning radius of the aircraft at various speeds and other data that defines parameters that could effect the area that the pilot will view or the onboard sensors or subsystems will interrogate during the subsequent flight simulation. In this regard, aircraft platforms having sensors with larger ranges will generally require the mission profiler to define a larger area than aircraft platforms having sensors with smaller ranges. Likewise, aircraft platforms having a larger turning radius will generally dictate that the mission profiler define a larger area for those portions of the area in which the aircraft will turn than aircraft platforms with a smaller turning radius. For each different aircraft platform, the mission profiler is therefore typically designed to define an area of a predetermined size, typically by extending both starboard and port from the mission route by a predefined distance.

The mission profiler 14 also defines the area for which terrain source data is required based upon the different types of points along the mission route. Therefore, for a respective aircraft platform, the mission profiler generally defines the area to extend a predefined distance to both the starboard and the port sides of the aircraft from the mission route. The mission profiler then modifies the area for which terrain source data is required based upon the different types of points along the mission route. For example, the area for which terrain source data is required is generally increased in regions surrounding the points that are indicative of a turn or a change in course of the mission route. For example, based upon a respective aircraft platform traveling at a predetermined speed, the mission profiler preferably increases the area by a predetermined amount in those regions in which the aircraft will turn. Based upon the mission route including the plurality of different types of points along the mission route and the aircraft platform, the mission profiler therefore refines the area for which terrain source data is required.

The processing element 18 of the mission profiler 14 also automatically divides the area into a plurality of regions based upon the mission route and determines a respective resolution of the terrain source data for each region. In this regard, the mission profiler generally defines a predetermined baseline resolution for the terrain source data, typically in units of meters or submeters. For certain regions of the area, however, the mission profiler will dictate that the terrain source data be provided with increased resolution in order to permit the pilot to view additional details of the region during the subsequent flight simulation. For example, those regions that surround a target or an airfield preferably have a greater resolution.

By way of example, a graphical depiction of the area for which terrain source data will be provided in conjunction with the mission route of FIG. 2 is depicted in FIG. 3. The graphical display of FIG. 3 also indicates that the area for which terrain source data is provided has been divided into two regions of different resolution. In this regard, the centrally located tiles having a lighter color have a greater resolution than the surrounding tiles having a darker color. For point of reference, the mission route is also plotted upon the graphical representation of the area for which terrain source data is provided to graphically depict relative sizes of the area for which imagery data will be provided with respect to the mission route.

The mission profiler 14 preferably defines each region to have a respective resolution. However, the input 16 of the mission profiler can also receive data defining the simulated platform upon which the terrain model constructed from the terrain source data will subsequently be displayed. As known to those skilled in the art, a flight simulator generally has an image generator that receives and processes a terrain model to produce the plurality of images displayed for the pilot during flight simulation. The image generators of different types of flight simulators have different processing capabilities. As such, the data provided to the mission profiler regarding the simulator platform provides an indication of the processing capabilities of the image generator. In instances in which the data indicates that the image generator of the flight simulator will be unable to effectively process a terrain model having increased resolution, the mission profiler will generally reduce the resolution of at least some and, more typically, all of the regions such that the resulting terrain model can be processed by the image generator. By somewhat reducing the resolution of at least some of the regions, the mission profiler prevents the generation of unnecessarily high resolution terrain models that will go unused by the flight simulator.

As described above, the mission profiler 14 is configured to define an area of a predetermined size relative to the mission route and to divide the area into regions of different predetermined resolutions, also based upon predefined criteria. The mission profiler of one advantageous embodiment permits a technician, a pilot or the like to adjust the predefined criteria, however, in order to adjust the size of the area for which terrain source data will be provided and to adjust the respective resolutions of different regions within the area. For example, a pilot may enlarge the area and increase the resolution of each region within the area by a predetermined percentage in order to make the subsequent flight simulation even more realistic.

The input 16 and the processing element 18 of the mission profiler 14 are typically comprised of a processor or other type of computing device for executing a computer program that provides the functionality of the mission profiler as described above. The computer program can be either embedded within the processing element or may be stored by a memory device external to and accessible by the processor or other computing device.

Once the mission profiler 14 has determined the area for which terrain source data is required and the respective resolution of different regions within the area, the mission profiler provides this information to an apparatus 20 for automatically collecting terrain source data for display during flight simulation. See FIG. 1. In this regard, the apparatus for automatically collecting terrain source data includes an input 22 for receiving the data provided by the mission profiler that defines the area containing the mission route for which terrain source data is required. Additionally, the input preferably receives the data provided by the mission profiler that defines the respective resolution of different regions within the area. See block 50 of FIG. 4.

The apparatus 20 for automatically collecting terrain source data also includes a search engine 24 for automatically searching a plurality of electronic collections 25 of terrain source data to identify terrain source data covering the area containing the mission route. See block 52. As known to those skilled in the art, a variety of electronic collections of terrain source data are maintained, both by governmental and commercial entities. Although the search engine can search any of the electronic collections of terrain source data, the search engine preferably searches those collections that have been approved by the national agencies. In one embodiment, for example, the search engine searches the electronic collections of terrain source data maintained by JSRPS, USIGS and MEL. In addition, the search engine of this embodiment can search the electronic collection of terrain source data provided by the National Weather Service, the United States Geological Survey (USGS) and by commercial satellites, such as IKONOS, LandSat, SPOT and the like.

The search engine 24 searches the electronic collections 25 of terrain source data to identify terrain source data that covers all, or at least the greatest percentage of, the area containing the mission route. In searching the electronic collections of terrain source data, the search engine will oftentimes identify terrain source data maintained by different electronic collections that depict the same portion of the area. In these instances, the search engine reviews the terrain source data from each electronic collection and selects the terrain source data that is of the highest quality and is most recent. For example, the search engine will select a digital photograph of a portion of the area taken on a clear day in the past week instead of a digital photograph of the same portion of the area taken on an overcast day two months ago, assuming that the mission is intended to be performed on a clear day. As such, the digital photograph taken on a clear day will be more representative of the situation with which the pilot will actually be confronted during the flight.

In addition to the search engine 24, the apparatus 20 for automatically collecting terrain source data also includes a memory device 26. Among other things, the memory device preferably stores terrain source data from prior mission routes. As such, the search engine not only searches the electronic collections 25 of terrain source data maintained by governmental and commercial entities, but also preferably searches the memory device for terrain source data covering all or a portion of the area for which terrain source data is required. In instances in which the memory device includes terrain source data for at least a portion of the area for which terrain source data is required, the search engine preferably also searches the electronic collections of terrain source data maintained by governmental and commercial entities to determine if the terrain source data maintained by these electronic collections is of higher quality or more recent than the terrain source data stored by the memory device. If the electronic collections of terrain source data maintained by governmental or commercial entities is of higher quality than the terrain source data stored by the associated memory device, the search engine will obtain the terrain source data from the electronic collections and, as such, will not use the terrain source data stored by the memory device. If, however, the terrain source data stored by the memory device is of equal to or better quality than the terrain source data maintained by the electronic collections, the search engine will not obtain the data from the electronic collections and will, instead, utilize the terrain source data stored by the memory device since the terrain source data stored by the memory device can be accessed more efficiently. See blocks 56 and 58 of FIG. 4.

Typically, the search engine 24 does not initially obtain the terrain source data. Instead, the search engine preferably initially obtains information representative of the terrain source data. This information that is representative of the terrain source data is commonly termed "metadata". The metadata typically defines the geographical region covered by the associated terrain source data and indicates the type of terrain source data, such as a digital photograph or the like, and the date on-which the terrain source data was obtained. In addition, the metadata may provide an indication of the conditions under which the terrain source data was obtained, such as cloudy, clear, rainy or the like. See block 54 of FIG. 4. Based upon the metadata, the search engine can identify terrain source data that covers the entire area for which terrain source data is required and can determine the terrain source data that will provide the highest quality image of the area.

By initially obtaining and reviewing information, such as metadata, representative of the terrain source data, however, the search engine 24 can more efficiently perform the search and analysis process than if the search engine obtained the terrain source data itself. In this regard, the metadata is typically a much smaller quantity of data than the associated terrain source data. As such, the metadata can be much more efficiently transferred and analyzed than the terrain source data.

Once a search engine 24 identifies the terrain source data maintained by one or more electronic collections 25 that is required in order to provide the highest quality terrain source data for the area, the terrain source data is obtained and stored by the memory device 26. See block 60. Although the memory device can be constructed in various manners, the memory device is typically comprised of first and second memory devices 26a, 26b. In this regard, the first memory device, such as a simple query language (SQL) database, typically stores the information, such as the metadata, representative of the terrain source data, while a second memory device, such as a mass storage system, stores the terrain source data itself. In order to efficiently locate the terrain source data within the second memory device, the first memory device can also store pointers or addresses for identifying the terrain source data associated with the metadata.

The input 22 and the search engine 24 are typically comprised of computer software that is supported and executed by a dedicated server. However, the computer software that generally comprises the input and the search engine can be supported and executed by a processor or other computing device, if so desired.

Once the terrain source data has been collected, the method and apparatus 10 of the present invention automatically process the terrain source data to refine the resulting image and to extract various features therefrom. As a result of this processing, the terrain source data is transformed into one or more predefined formats that can be subsequently accepted by the terrain engine, as described below. This automatic processing is typically performed by an image engine with the computer software that embodies the image engine typically being supported and executed by a processor or other computing device.

While the image engine 28 can perform any of a variety of conventional image processing techniques in order to refine the resulting data, the image engine of one embodiment performs an image enhancement function as shown in block 70 of FIG. 5 in order to perform atmospheric corrections. Additionally, the image engine can perform image registration of the enhanced image in order to register the images to fixed points. See block 72. Furthermore, the image engine can provide an elevation extraction function in order to generate an elevation model. See block 74. In this regard, the image engine or a memory device associated therewith typically includes a relatively low resolution elevation model of at least the geographic region surrounding the mission route. Based upon stereo pairs of the terrain source data, such as pairs of digital photographs that at least partially overlap, the elevation extraction function can extract elevation information in order to revise the low resolution elevation model to include the elevation of features above ground level, such as trees, buildings and the like.

Further, the image engine 28 can perform image rectification upon the registered image in order to remove image distortion and to make the resulting image square. See block 76 of FIG. 5. Following image rectification, the image engine can perform an image resolution merge in which the resulting image produced by the image rectification function is merged with low resolution imagery, typically provided by the second memory device 26b. See block 77. As such, higher resolution black and white images may be combined with lower resolution color images to create higher resolution color images. The image engine then performs an image mosaic function in order to merge a plurality of overlapping images and an image tonal balance function to balance the colors therebetween, thereby creating the resulting imagery data. See blocks 78 and 79.

Additionally, a material set 80 that defines the different types of materials, such as concrete, trees, wood, etc., that may be visible in the imagery data is provided. Based upon the imagery data and the material set, the image engine can perform a material classification function in order to generate a material map that defines the material type of various features in the imagery data. See block 82. The material map can then be provided to the various simulated sensors, such as the radar and the infrared sensors, onboard the aircraft platform such that the readings of the sensors will properly simulate actual flight conditions. The image engine can also extract two-dimensional features from the terrain source data in order to generate vector data based upon not only the terrain source data, but also the material map and low resolution feature data, typically provided by the second memory device 26b. See block 84. The two-dimensional feature data generally defines the features present in the imagery data when viewed from above. This vector data can be utilized to correct the elevation model in order to remove features that extend above ground level to generate a corrected elevation model representative of the elevation of the terrain itself, and not buildings, trees and the like that extend above ground level. See block 86. Finally, the image engine can perform a three-dimensional culture generation based upon the imagery data, the vector data and the output of the elevation extraction function in order to perform a three-dimensional feature extrusion function, thereby generating feature models. See block 88. In this regard, the three-dimensional feature extrusion function generates three-dimensional models of various features, such as trees, buildings, bridges and the like, that are represented in two-dimensions in the imagery data. The three-dimensional models can then be utilized to provide a more realistic simulation. The image engine of this embodiment therefore generates imagery data, a corrected elevation model, vector data, a feature model and a material map, each of which are stored by the memory device 26, more particularly, by the second memory device 26b.

While the individual image processing functions described above may be separately performed by a commercial software package entitled Imagine available from ERDAS, Inc. of Atlanta, Ga., the foregoing image processing functions have not previously been performed in an automated and integrated manner than minimizes, if not eliminates, manual interaction as provided by the image engine of the present invention. In addition, while one exemplary set of image processing functions has been described above, the method and apparatus 10 of the present invention can include other types of image engines 28 for performing a different sequence or set of image processing functions, if so desired.

The method and apparatus 10 of the present invention also includes a terrain engine 30 for compiling the processed data following image processing to create a terrain model for display during a subsequent flight simulation. As shown in FIG. 6, the terrain engine includes a data importer 32 for receiving processed data for the area containing the mission route. As described above, the processed data can include imagery data and one or more of a corrected elevation model, vector data, feature models and a material map. According to one advantageous embodiment, the data importer also receives project source data. The project source data has typically been previously stored in the memory device 26 and defines geospecific properties for the area containing the mission route. For example, the project source data can include information related to vegetation and information related to cultural features. The information related to vegetation may indicate that the area includes a large number of a particular type of tree having a specific color. As such, the color of the resulting image can be adjusted to ensure that the vegetation is properly depicted. Similarly, the information related to cultural features can include data that indicates that the area is chiefly covered by sand having a particular color. As such, the color of the resulting image can also be adjusted to ensure that the sand is properly depicted in order to permit a more realistic image to be generated. In addition to the data importer, the terrain engine also generally includes a terrain compiler 34 for combining the processed data and the project source data to create a terrain model that is stored in a database 35. In this regard, the terrain model is preferably stored in the format that will be acceptable to the simulation platform that will subsequently process and display the terrain model.

In addition to providing a terrain model, the terrain engine 30 can include a radar compiler for further processing the terrain model to generate a radar model that can utilized during a subsequent flight simulation to provide a corresponding radar display. The terrain engine can include any radar compiler known to those skilled in the art including the Multimode Radar Simulator of The Boeing Company.

The terrain engine 30 is typically comprised of a software program, such as the Terra Vista software package provided by Terrain Experts, Inc., that has been modified to accept and process project source data in addition to terrain source data. The computer software can be executed upon a variety of platforms, including a processor or other types of computing devices.

Regardless of its implementation, the terrain engine 30 can provide the terrain model to the flight simulator 36 in a variety of manners. In one embodiment depicted in FIG. 1, the apparatus 10 includes a compression unit 38 for compressing the terrain model, such as by means of wavelet compression or other conventional compression techniques, prior to being transmitted to a remote flight simulator, via either wired or wireless communication links. Upon receipt, a decompression unit 40 decompresses the terrain model and the decompressed terrain model is then stored. During a subsequent flight simulation, the terrain model can be provided to the image generator of the flight simulator in order to generate a realistic image of the area in which the mission route will be flown.

In order to further increase the efficiency with which the method and apparatus 10 of the present invention automatically generate the terrain model, the apparatus can be configured as depicted in FIG. 7 in order to perform a variety of the functions in parallel. In this regard, the apparatus can include a plurality of search engines 24 disposed in parallel for concurrently searching a plurality of different electronic collections 25 of terrain source data. Additionally, the apparatus can include a plurality of parallel image engines 28 in order to concurrently perform different image processing functions. Still further, the apparatus can include a plurality of terrain engines 30 for compiling or combining the terrain source data and the project source data for a variety of different terrain models at the same time. In addition to increasing the efficiency with which terrain models can be generated, the embodiment of the apparatus depicted in FIG. 7 is scalable so that additional search, image and terrain engines can be added as the demand increases. In addition, the search, image and terrain engines are preferably hot swappable in order to permit continuous processing, even in instances in which one of the engines fails.

As also depicted in FIG. 7, the method and apparatus 10 can include a resource manager 42, also typically embodied by a computer program that is executed by a processor or other computing device, for allocating or scheduling the plurality of tasks to different ones of the search, image and terrain engines. In this regard, the resource manager typically receives the definition of the areas for which terrain source data is required and the respective resolutions of different regions within the areas from the mission profiler 14. The resource manager includes a queue 44 for maintaining a prioritized list of the plurality of tasks required to generate a terrain model for each area defined by the mission profiler. These tasks include identifying terrain source data covering each of the areas, processing the terrain source data and compiling the processed data and any project source data to generate respective terrain models. Additionally, the resource manager includes a task pipeline 46 for assigning respective tasks to different ones of the search, image and terrain engines in order to perform the respective tasks in the most efficient manner as known to those skilled in the art.

As a result of the automatic generation of the terrain model, the method and apparatus 10 of the present invention permit the terrain model to be more efficiently generated with substantially less manual participation than conventional techniques. Additionally, the resulting terrain model should be of the highest quality since the terrain source data that is most acceptable, typically by being of the highest quality and/or the most recent, is collected and compiled to create the terrain model. Moreover, the terrain model may also be partially based upon project source data to further improve the realistic appearance of the resulting terrain model.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A program product embodied in a computer readable medium for automatically collecting terrain source data for display during flight simulation comprising:
    an input for receiving data defining an area containing a mission route for which terrain source data is required; and
    a search engine for automatically searching a plurality of electronic collections of terrain source data to identify terrain source data covering the area containing the mission route, wherein said search engine is capable of identifying terrain source data from at least two alternative electronic collections of terrain source data that represents a common region of the area containing the mission route, and wherein said search engine is further capable of selecting the terrain source data from one of the plurality of alternative electronic collections of terrain source data that is most representative of anticipated flight conditions along the mission route to represent the common region of the area containing the mission route; and
    wherein the search engine is capable of accessing a memory device that stores the terrain source data covering the area containing the mission route identified by the search engine to facilitate display during flight simulation.

2. A program product embodied in a computer readable medium according to claim 1 wherein said memory device stores terrain source data from prior mission routes.

3. A program product embodied in a computer readable medium according to claim 2 wherein said search engine compares terrain source data obtained from an electronic collection of terrain source data with terrain source data from prior mission routes to determine the terrain source data that is most representative of anticipated flight conditions along the mission route.

4. A program product embodied in a computer readable medium according to claim 3 wherein said search engine obtains information representative of the terrain source data that is obtainable from the electronic collection of terrain source data, wherein said search engine obtains the terrain source data from the electronic collection of terrain source data that is most representative of the anticipated flight conditions along the mission route than terrain source data from prior mission routes, and wherein said memory device stores the terrain source data obtained from the electronic collection.

5. A program product embodied in a computer readable medium according to claim 4 wherein said memory device comprising:
   a first memory device for storing the information representative of the terrain source data; and
   a second memory device for storing the terrain source data.

6. A program product embodied in a computer readable medium according to claim 1 wherein said search engine is further capable of selecting the terrain source data from the electronic collection of terrain source data that has been captured most recently as the terrain source data that is most representative of the anticipated flight conditions along the mission route.

7. A program product embodied in a computer readable medium according to claim 1 wherein said search engine is further capable of selecting the terrain source data from the electronic collection of terrain source data that has the highest quality as the terrain source data that is most representative of the anticipated flight conditions along the mission route.

8. A method for automatically collecting terrain source data for display during flight simulation, the method comprising:
   receiving data defining an area containing a mission route for which terrain source data is required;
   automatically searching a plurality of electronic collections of terrain source data to identify terrain source data covering the area containing the mission route, wherein automatically searching the plurality of electronic collections of terrain source data comprises identifying terrain source data from at least two alternative electronic collections of terrain source data that represents a common region of the area containing the mission route, and thereafter selecting the terrain source data from one of the plurality of alternative electronic collections of terrain source data that is most representative of anticipated flight conditions along the mission route to represent the common region of the area containing the mission route; and
   storing the terrain source data covering the area containing the mission route identified by the search engine to facilitate display during flight simulation.

9. A method according to claim 8 wherein storing the terrain source data comprises storing terrain source data from prior mission routes.

10. A method according to claim 9 wherein automatically searching the plurality of electronic collection of terrain source data comprises comparing terrain source data obtained from an electronic collection of terrain source data with terrain source data from prior mission routes to determine the terrain source data that is most representative of anticipated flight conditions along the mission route.

11. A method according to claim 10 wherein automatically searching the plurality of electronic collections of terrain source data further comprises obtaining information representative of the terrain source data that is obtainable from the electionic collection of terrain source data, and obtaining the terrain source data from the electronic collection of terrain source data that is most representative of the anticipated flight conditions along the mission route and wherein storing the terrain source data comprises storing the terrain source data obtained from the electronic collection.

12. A method according to claim 8 wherein selecting the terrain source data further comprises selecting the terrain source data from the electronic collection of terrain source data that has been captured moat recently as the terrain source data that is most representative of the anticipated flight conditions along the mission route.

13. A method according to claim 8 wherein selecting the terrain source data further comprises selecting the terrain source data from the electronic collection of terrain source data that has the highest quality as the terrain source data that is most representive of the anticipated flight conditions along the mission route.

* * * * *